United States Patent [19]
Schmid et al.

[11] Patent Number: 5,505,399
[45] Date of Patent: Apr. 9, 1996

[54] BELT RETRACTOR FOR VEHICULAR SEAT BELT SYSTEMS

[75] Inventors: Johannes Schmid, Schwäbisch Gmünd; Thomas Mödinger, Alfdorf, both of Germany

[73] Assignee: TRW Repa GmbH, Aldorf, Germany

[21] Appl. No.: 251,490

[22] Filed: May 31, 1994

[51] Int. Cl.$^6$ ............................................. B60R 22/46
[52] U.S. Cl. ............................................. 242/374
[58] Field of Search ............................. 242/374; 297/478, 297/480; 280/806

[56] References Cited

U.S. PATENT DOCUMENTS

| | | | |
|---|---|---|---|
| 4,558,832 | 12/1985 | Nilsson | 242/374 |
| 5,326,042 | 7/1994 | Nishizawa et al. | |

FOREIGN PATENT DOCUMENTS

| | | |
|---|---|---|
| 581288 | 2/1994 | European Pat. Off. . |
| 2505626 | 8/1976 | Germany . |
| 2535380 | 2/1977 | United Kingdom ................ 242/374 |
| 2237978 | 5/1991 | United Kingdom . |
| 8700809 | 2/1987 | WIPO . |

OTHER PUBLICATIONS

English Language Abstract of Japanese Patent Document No. 60–99741 Jun. 1985.
English Language Abstract of Japanese Patent Document No. 60–240,549 Nov. 1985.
English Language Abstract of Japanese Patent Document No. 3–200,454 Sep. 1991.

Primary Examiner—John P. Darling
Attorney, Agent, or Firm—Tarolli, Sundheim, Covell, Tummino & Szabo

[57] ABSTRACT

A belt retractor (10) for vehicular seat belt systems has a rotational belt tensioner drive (12) engaging a belt reel (16). A speed-up planetary gearing (26, 28, 30) is inserted in the power flow between the belt tensioner drive (12) and the belt reel (16). The planetary gearing (26, 28, 30) includes a sun gear (26), planetary gears (28) and a ring gear (30).

6 Claims, 4 Drawing Sheets

BELT RETRACTOR FOR VEHICULAR SEAT BELT SYSTEMS

The invention relates to a belt retractor for vehicular seat belt systems having a rotational belt tensioner drive engaging the belt reel.

From DE 32 15 925 A1 a belt retractor is known, the belt tensioner of which features a rotary-piston rotational drive engaging the belt reel via a cable, and a gas generator. This rotational drive comprises a cylinder in which a rotary piston is rotatably mounted, the latter being firmly connected to a retraction pulley. Anchored in the retraction pulley is the cable which runs from the retraction pulley to the extension pulley which is positively connected to the belt reel. The cable is wrapped around this extension pulley a number of times and anchored thereto. When the rotary-piston rotational drive of the belt tensioner is activated the retraction pulley is rotated, uncoiling the cable from the extension pulley and coiling it up on the retraction pulley. Due to rotation of the extension pulley the belt reel is rotated in the coiling direction of the belt, thereby eliminating belt slack. The translation of the piston movement to the belt reel by means of cable and retraction pulley suffers considerably losses which need to be compensated for by dimensioning the gas generator larger.

This assembly also necessitates much room for installation.

The invention is based on the object of achieving for a belt retractor of the aforementioned kind a more compact configuration which makes good use of available gas generator power and which provides a large tensioning stroke.

This object is achieved according to the invention by inserting a speed-up planetary drive between the belt tensioner drive and the belt reel so that substantially low-loss and speed-up transmission and of the drive movement of the belt tensioner drive to the belt reel is assured. In addition, a more favorable arrangement of the belt tensioner drive to the belt reel is permitted within existing belt retractor geometries at little expense. The assembly comprising the belt retractor and the belt tensioner according to the invention takes up hardly more room than that of a belt retractor of the same kind but without belt tensioner. On top of this the plenatary drive ensures high efficiency in transmission of the drive movement of the belt tensioner. Due to the speed-up transmission a large tensioning stroke is also permitted by simple means despite a small working stroke of the tensioner drive.

In accordance with one advantageous embodiment of the invention the planetary gearing comprises an internally toothed ring gear, planetary gears, a planet carrier and a sun gear, the planetary gears engaging the internal toothing of the ring gear and the outer toothing of the sun gear.

For a more compact embodiment of the belt retractor it is good practice to configure the belt tensioner drive as a rotary-piston rotational drive with a gas generator and a drive section connected to the ring gear, with the sun gear of the planetary gearing permitting drivable coupling to the belt reel and the planetary carrier fixed with the retractor housing. In this arrangement, for example, an extension of the rotary piston is formed on the outer circumference of the ring gear, whereby the extension of the rotary piston forms together with the ring gear a single-vane rotary piston and orbits in a ring-shaped space surrounding the ring gear.

Further features and advantages of the invention will now be described on the basis of an advantageous embodiment with reference to the drawing in which.

Figure 1:
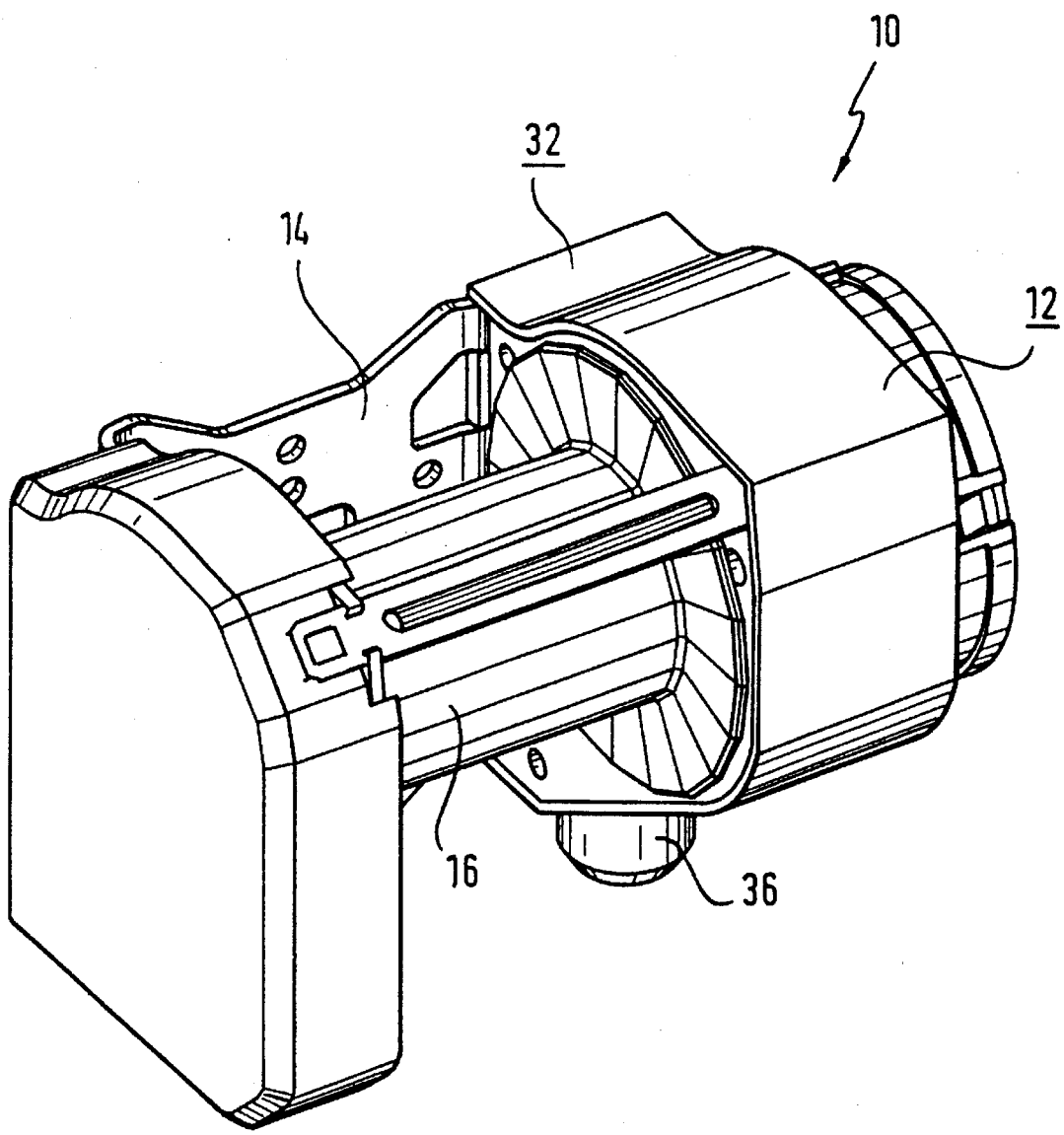
FIG. 1 is a perspective view of a belt retractor in accordance with one embodiment of the present invention.

In the embodiment of a belt retractor 10 of a vehicular seat belt system shown in FIGS. 1 to 5 which includes a belt tensioner drive 12 a belt reel 16 is rotatably mounted between the arms of a load-carrying housing 14. A belt webbing 18 (FIG. 4) is wound on the belt reel 16.

On the left-hand side of the housing 14 shown in FIG. 1 a conventional (and thus not depicted) controlling mechanism for blocking the belt reel is provided together with a retraction spring engaging the end of the belt reel 16, this spring loading the belt reel 16 in the coiling direction of the belt webbing. A locking pawl 20 (FIG. 4) inhibits rotation of the belt reel 16 in the uncoiling direction of the belt webbing sensitive to vehicle and/or belt webbing movements.

On the oppopsite side of the housing 14 the function parts are provided as required for the belt tensioning function.

These parts include a clamping roller coupling 24 engaging the projection 22 of the belt reel 16, a sun gear 26 of a planetary gearing connected to the clamping roller coupling 24, three planetary gears 28 engaging the sun gear 26, a ring gear 30 with internal toothing engaging the planetary gears 28 and a drive block 32 with a cylindrical recess as part of a rotary-piston rotational drive with a cover 34. The projection 22 of the belt reel 16, the clamping roller coupling 24, the sun gear 26, the drive block 32 and the ring gear 30 are each arranged coaxially. The drive block 32 has a housing section 320 in which a bore 35 is provided to receive a pyrotechnical gas generator 36. The ring gear 30 is arranged coaxially in the cylindrical recess of the drive block 32, it defining the recess radially inwards so that a ring-shaped space is formed. On the exterior of the ring gear 30 an extension of the rotary piston 301 is formed as part of the rotational drive which extends radially outwards up to the shell surface of the cylindrical recess of the drive block 32. The extension of the rotary piston 301 thus forms together with the ring gear 30 a single-vane rotary piston which orbits in the ring-shaped space surrounding the ring gear. A partition 38 extends from the cylindrical inner wall of the drive block 32 up to the ring gear 30. The ring-shaped space is thus divided into two annular chamber regions 321 and 322 between the raised face of the rotary piston 301 and the partition 38. The first annular chamber region 321 is partly flared in the direction of the gas generator 36 so that the gas outlet opening of the gas generator 36 forms a flow connection together with the first annular chamber 321.

Directly alongside the partition 38 in the second annular chamber 322 an outlet opening 40 is provided. This outlet opening 40 extends from the second annular chamber 322 up to the outer surface of the drive block 32 and permits a gas flow from the second ring chamber 322 to the environment and vice-versa when the single-vane rotary piston comprising the ring gear 30 and the extension of the rotary piston 301 is moved.

Figure 2:
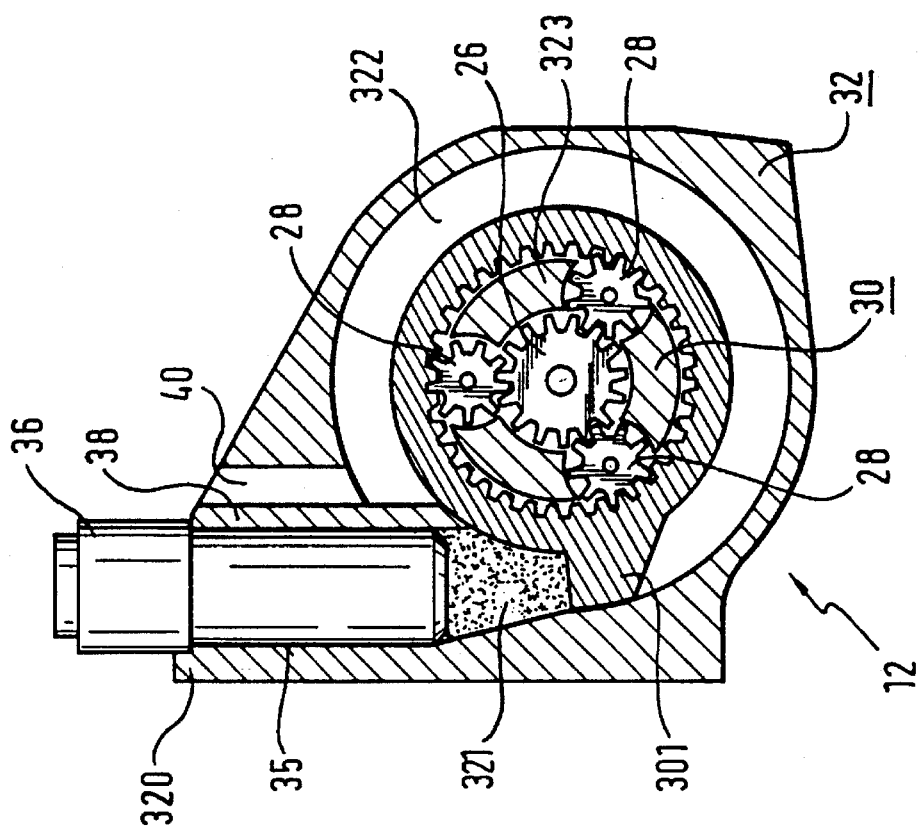
FIGS. 2 and 3 are a schematic section view through the belt tensioner drive of FIG. 1 in various conditions.
Figure 3:
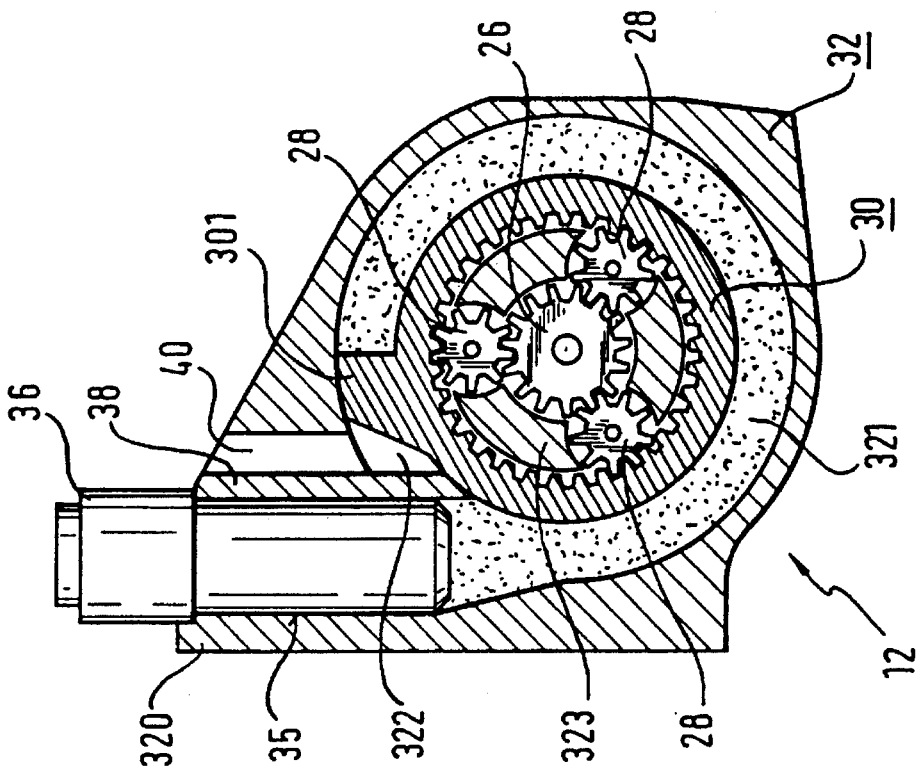
Figure 4:
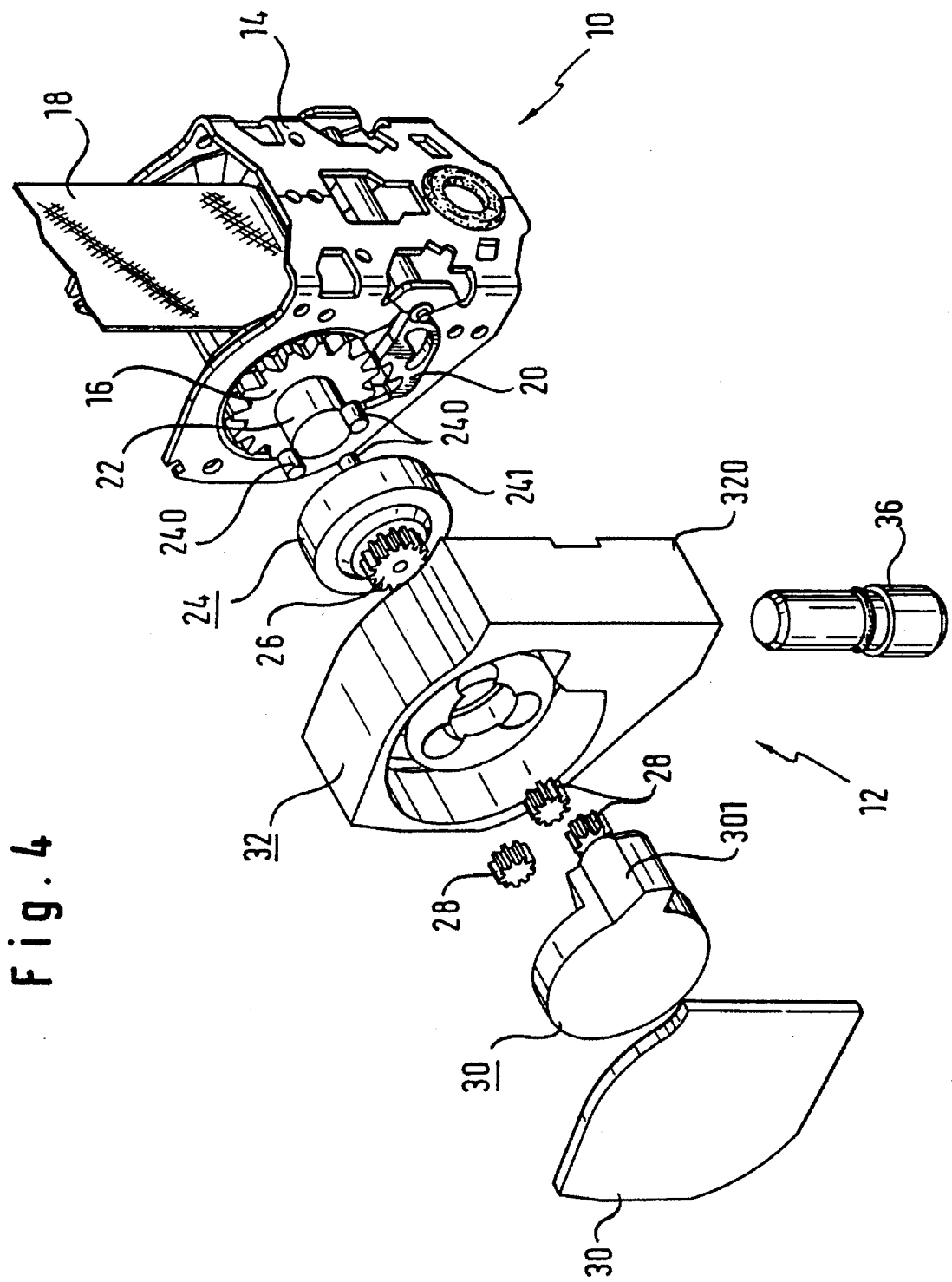
FIG. 4 is a schematic, perspective exploded view of a part of the belt retractor shown in FIG. 1 including the belt webbing.
Figure 5:
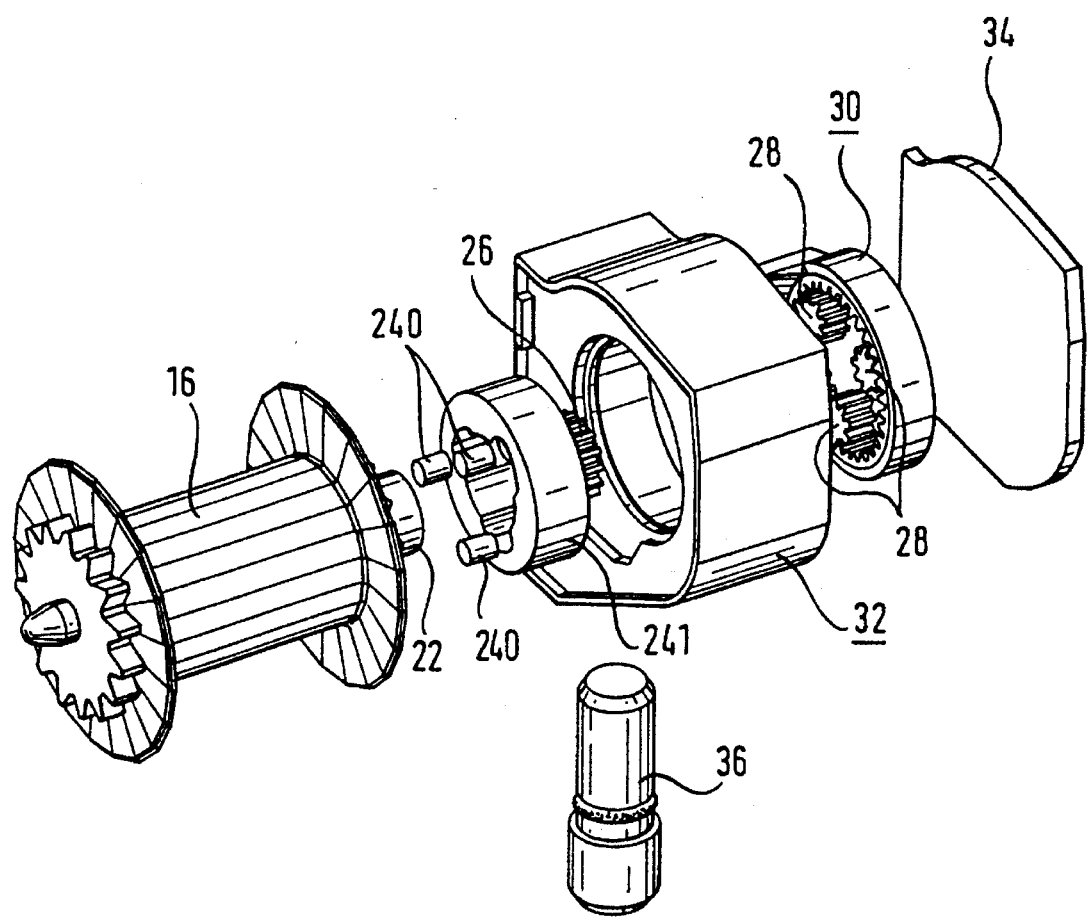
FIG. 5 is a schematic, perspective exploded view of a part of the belt retractor shown in FIG. 1 without the belt webbing and belt reel housing.

As can be seen from the FIGS. 2 and 3 the planetary gears 28 are arranged equidistant from each other around the sun gear 26. The planetary gears 28 are inserted in recesses of a planet carrier 323 so that the planet gears 28 have a fixed bearing and the axes of the sun gear 26, planetary gears 28 and ring gear 30 have no movement relative to each other. The internal toothing of the ring gear 30, the size of the planetary gears 28 and of the sun gear 26 are each selected so that rotary movement of the ring gear 30 results in movement of the sun gear 26 with the necessary speed-up transmission.

The sun gear 26 is formed integral with a bell-shaped part 241 of the clamping roller coupling 24, the latter being provided with clamping rollers 240. When the belt tensioner drive 12 is activated by rotation of the ring gear 30 which engages the planetary gears 28, these in turn engaging the sun gear 26, the clamping rollers 240 are caused to engage the projection 22 of the belt reel 16, thus resulting in the belt tensioner drive 12 being drivingly coupled to the belt reel 16.

To activate the belt tensioner drive 12 the pyrotechnical gas generator 36 is ignited either mechanically or electrically so that gases emerge from the gas generator 36 and enter the first annular chamber 321. The gases emerging from the gas generator 36 impinge on the extension of the rotary piston 301 and propel it through the annular space. Through the outlet opening 40 the air is able to escape from the annular chamber region 322 on rotation of the extension of the rotary piston 301. The ring gear 30 together with the extension of the rotary piston 301, i.e. the single-vane rotary piston, is now turned counter-clockwise as shown in FIGS. 2 and 3. Rotation of the extension of the rotary piston 301 and thus of the ring gear 30 counter-clockwise causes also the fixed arrangement of the planetary gears 28 to turn counterclockwise. Accordingly the sun gear 26 is turned clockwise as shown in FIGS. 2 and 3. Due to the resulting rotation of the bell-shaped part 241 of the clamping roller coupling 24 the clamping rollers 240 are caused to engage the cylindrical projection 22 of the belt reel 16, resulting in the bell-shaped part 241 and thus the sun gear 26 and the coupling projection 22 being connected together for joint rotation. Rotation of the ring gear 30 rotates the belt reel 16 in the belt retraction direction and eliminates belt slack.

On completion of belt tensioning the belt reel 16 is locked by means of the locking pawl 20. The clamping rollers 240 which continue to turn due to their inertia release themselves from the clamped engagement with the projection 22 of the belt reel 16 so that functioning of the locking system is not detrimented.

Due to the coaxial arrangement of the drive parts of the rotary piston rotational drive and inclusion of planetary gearing not only a step-up transmission of the forces concerned is achieved, but also losses are maintained slight whilst permitting a compact configuration. In addition, a large tensioning stroke is achieved for a small working stroke of the rotary drive by simple means. The conventional locking function of the automatic blocking feature sensitive to vehicle and belt webbing movements as well as the freedom of movement or retraction function of the belt retractor 10 are not detrimented by the function of the tensioner since the clamping roller coupling 24 uncouples the belt tensioner drive 12 from the belt reel 16 once tensioning has taken place.

What is claimed is:

1. A seat belt retractor having a frame, a belt reel rotatably mounted in said frame, a rotary belt pretensioner drive with a driving member, a speed-up planetary gearing having an internally toothed ring gear connected to said driving member, planetary gears, a planet carrier and a sun gear, said planetary gears engaging said internal toothing of the ring gear and an outer toothing of the sun gear, a selectively engageable rotary coupling being inserted between said sun gear and said belt reel.

2. The seat belt retractor of claim 1, wherein each of said planet gears is accomodated in a recess of said planet carrier.

3. The seat belt retractor of claim 1, wherein said driving member is coupled to said ring gear and said rotary coupling is connected between said sun gear and said belt reel, said planetary carrier being fixed with respect to said frame.

4. The seat belt retractor of claim 1, wherein said rotary belt pretensioner drive comprises a rotary-piston in an expansion chamber and a gas generator adapted to drive said piston in said expansion chamber, and said driving member is formed by said rotary-piston.

5. The seat belt retractor of claim 4, wherein said ring gear is integrally formed with a vane on its outer periphery, said ring gear with said vane forming the rotary-piston of said rotary drive.

6. The seat belt retractor of claim 1, wherein said rotary coupling comprises a ring member connected to said sun gear, a cylindrical stud connected to said belt reel and surrounded by said ring member, and a plurality of clamping rollers between said ring member and said cylindrical stud.

\* \* \* \* \*